(12) United States Patent
Lee

(10) Patent No.: US 8,547,495 B2
(45) Date of Patent: Oct. 1, 2013

(54) DISPLAY DEVICE AND METHOD FOR MANUFACTURING THEREOF

(75) Inventor: Jung Mok Lee, Gyeonggi-do (KR)

(73) Assignee: LG Display Co., Ltd., Seoul (KR)

(*) Notice: Subject to any disclaimer, the term of this patent is extended or adjusted under 35 U.S.C. 154(b) by 494 days.

(21) Appl. No.: 12/663,940

(22) PCT Filed: Jun. 9, 2008

(86) PCT No.: PCT/KR2008/003210
§ 371 (c)(1),
(2), (4) Date: Dec. 10, 2009

(87) PCT Pub. No.: WO2008/153293
PCT Pub. Date: Dec. 18, 2008

(65) Prior Publication Data
US 2010/0171900 A1 Jul. 8, 2010

(30) Foreign Application Priority Data

Jun. 15, 2007 (KR) .......... 10-2007-0058937
Jun. 20, 2007 (KR) .......... 10-2007-0060229

(51) Int. Cl.
*G02F 1/1333* (2006.01)
*G09F 13/04* (2006.01)
*G09F 13/08* (2006.01)

(52) U.S. Cl.
USPC .................................. 349/58; 362/97.2

(58) Field of Classification Search
USPC ................ 349/58, 60; 362/97.1, 97.2
See application file for complete search history.

(56) References Cited

U.S. PATENT DOCUMENTS

| 5,243,453 | A  | * | 9/1993  | Kawaguchi et al. | 349/60  |
|-----------|----|---|---------|------------------|---------|
| 5,854,667 | A  | * | 12/1998 | Ackermann        | 349/187 |
| 6,214,261 | B1 | * | 4/2001  | Smarto et al.    | 264/1.7 |
| 7,092,048 | B2 |   | 8/2006  | Jeong            |         |
| 7,301,588 | B2 | * | 11/2007 | Ogawa            | 349/58  |
| 2005/0057706 | A1 | * | 3/2005  | Seki et al.    | 349/96  |
| 2006/0274224 | A1 | * | 12/2006 | Jeong          | 349/58  |
| 2007/0030699 | A1 | * | 2/2007  | Tseng et al.   | 362/633 |

FOREIGN PATENT DOCUMENTS

| CN | 2049782 U    |   | 12/1989 |
|----|--------------|---|---------|
| CN | 1558279 A    |   | 12/2004 |
| CN | 1696783 A    |   | 11/2005 |
| JP | 5-53109      | * | 3/1993  |
| JP | 5-313161     | * | 11/1993 |
| JP | 2000-221331 A |  | 8/2000  |
| JP | 2004-354487 A |  | 12/2004 |
| JP | 2005-24924 A  |  | 1/2005  |
| JP | 2005-250269 A |  | 9/2005  |
| JP | 2007-225633   | * | 9/2007  |
| KR | 10-2002-0018219 A | | 3/2002 |
| KR | 10-2004-0065420 A | | 7/2004 |
| KR | 10-2005-0123116 A | | 12/2005 |
| KR | 10-2007-0052082 A | | 5/2007 |
| KR | 10-2007-0060816 A | | 6/2007 |

\* cited by examiner

*Primary Examiner* — Mark Robinson
*Assistant Examiner* — Robert Tavlykaev
(74) *Attorney, Agent, or Firm* — Birch, Stewart, Kolasch & Birch, LLP

(57) ABSTRACT

Disclosed is a display device. The display device comprises a frame receiving at least one of a liquid crystal panel and a backlight unit, an adhesive layer coupling the liquid crystal panel to the backlight unit, and wherein the adhesive layer comprises at least one of an adhesive sheet for light diffusion and a polarizer film.

17 Claims, 3 Drawing Sheets

DISPLAY DEVICE AND METHOD FOR MANUFACTURING THEREOF

CROSS-REFERENCE TO RELATED APPLICATIONS

This application is the U.S. national stage application of International Patent Application No. PCT/KR2008/003210, filed Jun. 9, 2008, which claims priority to Korean Application Nos. 10-2007-0058937, filed Jun. 15, 2007 and 10-2007-0060229, filed Jun. 20, 2007, the disclosures of each of which are incorporated herein by reference in their entirety.

TECHNICAL FIELD

The embodiment relates to a display device and a method for manufacturing the same.

An LCD (liquid crystal display) belonging to a display device consumes low power. Further, an LCD has light weight and small volume. An LCD has been widely utilized for computer, electronics and information communication industries. In particular, An LCD has been variously applied to display devices of various portable terminals.

BACKGROUND ART

An LCD comprises a liquid crystal panel for displaying image information, and a backlight unit for providing light to the liquid crystal panel.

Since the liquid crystal panel is a passive device that does not spontaneously emit light, the liquid crystal panel needs a backlight unit. The performance of a liquid crystal display module is significantly dependent on the performance of the backlight unit as well as the liquid crystal panel.

Since the liquid crystal panel and backlight unit have predetermined thickness, there are limitations in fabrication of a slim display device having a small size.

DISCLOSURE OF INVENTION

Technical Problem

The embodiments provide a slim display device having a small size and a method for manufacturing the same.

Technical Solution

According to an embodiment, a display device comprising: a frame receiving at least one of a liquid crystal panel and a backlight unit; and an adhesive layer coupling the liquid crystal panel to the backlight unit, wherein the adhesive layer comprises at least one of an adhesive sheet for light diffusion and a polarizer film.

According to an embodiment, a display device comprising: a frame receiving at least one of a liquid crystal panel and a backlight unit; and an adhesive layer coupling the liquid crystal panel to the backlight unit, wherein the frame comprises resin.

According to an embodiment, a method for manufacturing a display device comprising the steps of: installing at least one of a liquid crystal panel and a backlight unit in a mold for forming a frame; injecting resin into the mold; and curing the resin to form the frame coupled to at least one of the liquid crystal panel and the backlight unit.

Advantageous Effects

According to the display device and the method for manufacturing the same based on the embodiments, the frame that receives the liquid crystal panel and the backlight unit includes resin, so that the display device can be fabricated with a slim structure and a small size.

Further, the frame includes resin having elasticity, so that the liquid crystal panel and the backlight unit can be prevented from being broken due to external impact.

Further, the frame can also be fabricated with a slim structure corresponding to the slimness of the liquid crystal panel.

Further, since the frame has flexible material and structure, the frame can be applied to various display modules.

Further, the liquid crystal panel is firmly coupled to the backlight unit using an adhesive sheet, so that the coupling force therebetween can be reinforced.

Further, the liquid crystal panel is firmly coupled to the backlight unit using the adhesive sheet, so that the manufacturing procedure can be simplified and the manufacturing cost can be reduced.

Furthermore, since the adhesive sheet diffuses light, an additional optical sheet is not necessary. Accordingly, the display device can be fabricated with a slim structure and a small size.

Moreover, the liquid crystal panel is coupled to the backlight unit using a polarizer film, so that the display device can be fabricated with a slim structure and a small size.

In addition, the liquid crystal panel is coupled to the backlight unit using the polarizer film, so that the manufacturing procedure can be simplified and the manufacturing cost can be reduced.

MODE FOR THE INVENTION

Hereinafter, embodiments will be described with reference to accompanying drawings.

Figure 1:
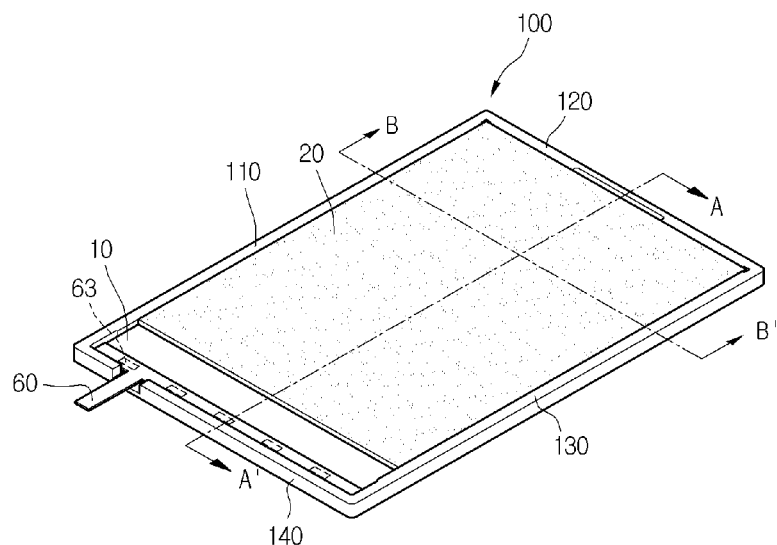
FIG. 1 is a perspective view showing a display device according to a first embodiment.
Figure 2:
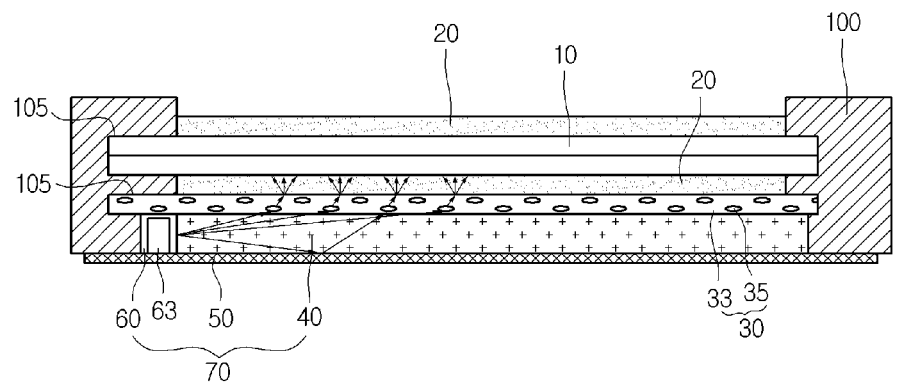
FIG. 2 is a sectional view taken along line A-A in FIG. 1.

FIG. 1 is a perspective view showing a display device according to a first embodiment, and FIG. 2 is a sectional view taken along line A-A in FIG. 1.

Referring to FIGS. 1 to 2, the display device according to the first embodiment comprises a liquid crystal panel 10, a backlight unit 70, an adhesive sheet 30 for light diffusion, and a frame 100.

The liquid crystal panel 10 is formed by interposing a liquid crystal layer between a TFT substrate and a color filter substrate. Further, a polarizer film 20 is formed on the upper and lower portions of the liquid crystal panel 10.

The backlight unit 70 comprises a light emitting section 60, a light guide plate 40 and a reflective sheet 50.

The light emitting section 60 comprises an LED (light emitting diode) 63, a CCFL (cold cathode fluorescent lamp) and the like, and outputs generated light to the light guide plate 40.

The light guide plate 40 receives the light generated from the light emitting section 60 to uniformly distribute the light over the whole emitting area of the backlight.

The reflective sheet 50 is attached to the lower portion of the light guide plate 40. The reflective sheet 50 reflects the light, which is leaked through the lower portion of the light guide plate 40, to the liquid crystal panel 10.

The liquid crystal panel 10 is coupled to the backlight unit 70. According to the first embodiment, the adhesive sheet 30 is interposed between the liquid crystal panel 10 and the backlight unit 70, so that the liquid crystal panel 10 can adhere to the backlight unit 70.

The adhesive sheet 30 comprises a mixture of a liquid adhesive 33 and grains 35 for light scattering. For example, the liquid adhesive 33 may comprise resin and the grain 35 may comprise acryl. Since the liquid adhesive 33 comprising silicon, synthetic resin and the like has adhesive characteristics, the liquid crystal panel 10 and the backlight unit 70 can be coupled by the liquid adhesive 33

Further, since the grain 35 comprising acryl scatters incident light, the grain 35 is interposed between the liquid crystal panel 10 and the backlight unit 70 to diffuse light.

The frame 100 receives and fixes at least one of the liquid crystal panel 10 and the backlight unit 70.

The frame 100 comprises sidewalls 110, 120, 130 and 140. For example, the four sidewalls 110, 120, 130 and 140 can be prepared in the form of a rectangular frame.

One or more receiving grooves 105 are formed in the inner peripheral surfaces of the sidewalls 110, 120, 130 and 140. The side portions of the liquid crystal panel 10 and the backlight unit 70 can be inserted into the receiving grooves 105 of the sidewalls 110, 120, 130 and 140, so that the frame 100 can receive the liquid crystal panel 10 or the backlight unit 70.

Accordingly, since there is no need for a double coated tape which is an additional adhesive member for fixing the liquid crystal panel 10 and the backlight unit 70 in the frame 100, the manufacturing process and cost can be reduced.

The frame 100 may comprise resin containing silicon or synthetic resin. For example, the resin may have various colors including white, transparent color, black and the like.

Since the frame 100 comprises resin, it can have elasticity. If external impact is applied to the frame 100 that receives the liquid crystal panel 10 and the backlight unit 70, the impact can be absorbed by the elasticity of the frame 100. Accordingly, the liquid crystal panel 10 and the backlight unit 70 can be protected by the frame 100.

Referring to FIG. 2, the light emitting section 60 is located at one side of the light guide plate 40. The liquid crystal panel 10 is coupled to the upper portion of the light guide plate 40 using the adhesive sheet 30.

Light generated from the LED 63 of the light emitting section 60 located at one side of the light guide plate 40 is distributed in the direction of the liquid crystal panel 10 through the light guide plate 40.

In particular, the adhesive sheet 30 is located on the light guide plate 40. Accordingly, the light irradiated in the direction of the liquid crystal panel 10 through the light guide plate 40 can be scattered while passing through the grains 35 of the adhesive sheet 30, and distributed in the direction of the liquid crystal panel 10.

Further, the adhesive sheet 30 comprising the mixture of the liquid adhesive 33 and the grains 35 is interposed between the liquid crystal panel 10 and the backlight unit 70, so that the liquid crystal panel 10 and the backlight unit 70 can adhere to each other.

Accordingly, an additional adhesive tape used for fixing the liquid crystal panel 10 and the backlight unit 70 is not necessary. Further, since an optical sheet used for diffusing the light in the backlight unit 70 is not necessary, the number of elements included in the display device is reduced. However, the same effect as that obtained using the optical sheet can be achieved.

In addition, the number of parts included in the display device is reduced, so that the manufacturing process and cost can be reduced.

Hereinafter, the manufacturing method of the display device according to the first embodiment will be described with reference to FIGS. 3 to 6.

Figure 3:
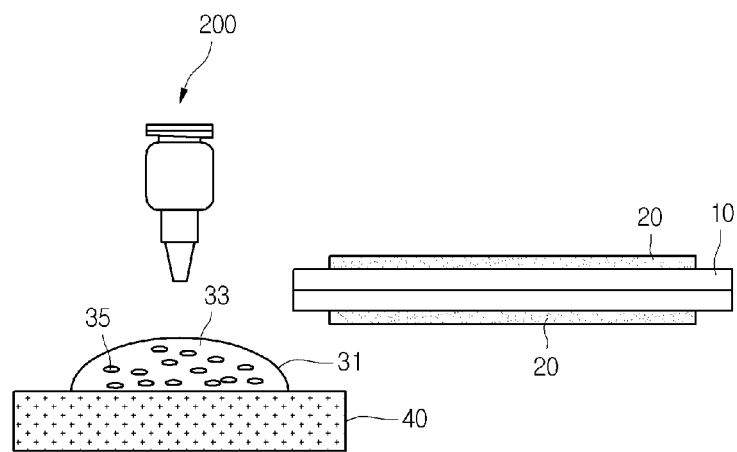
FIGS. 3 to 5 are sectional views showing a manufacturing method of a display device according to a first embodiment.
Figure 4:
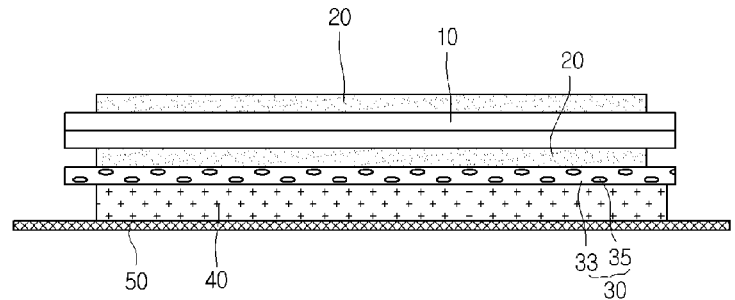
Figure 5:
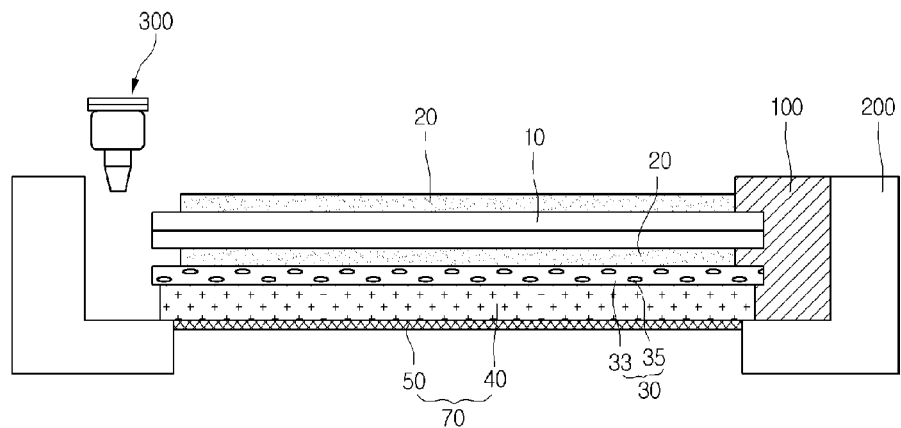
Figure 6:
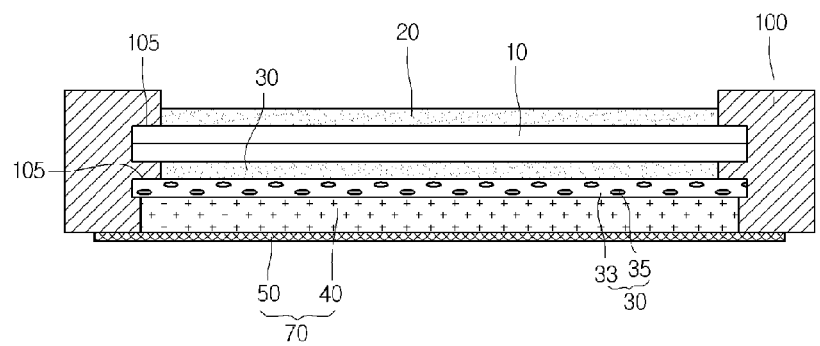
FIG. 6 is a sectional view taken along line B-B in FIG. 1.

FIG. 3 is a sectional view showing a state in which the adhesive material for light diffusion is coated on the light guide plate and coupled to the liquid crystal panel. FIG. 4 is a sectional view showing a state in which the backlight unit and the liquid crystal panel are coupled to the light guide plate by the adhesive sheet. FIG. 5 is a sectional view showing a process in which the frame is formed at the backlight unit and the liquid crystal panel coupled by the adhesive sheet. FIG. 6 is a sectional view showing the coupling state of the frame and a sectional view taken along line B-B in FIG. 1.

Referring to FIG. 3, the light guide plate 40 of the backlight unit 70 and the liquid crystal panel 10 are prepared. Although not shown in FIG. 3, the backlight unit 70 may comprise the reflective sheet 50 and the light emitting section 60.

The polarizer films 20 can be formed on the upper and lower portions of the liquid crystal panel 10.

After an adhesive injector 200 is located above the light guide plate 40, adhesive sheet material 31 for light diffusion is coated on the light guide plate 40. For example, the adhesive sheet material 31 may comprise a mixture of the liquid adhesive 33 and the acryl which is the grain 35 for light scattering.

Referring to FIG. 4, after the liquid crystal panel 10 is located on the light guide plate 40 coated with the adhesive sheet material 31, the light guide plate 40 is coupled to the liquid crystal panel 10.

Then, while the adhesive sheet material 31, which is formed by mixing the silicon with the acryl, is cured, the liquid crystal panel 10 can be coupled to the backlight unit 70.

At this time, the adhesive sheet material 31 is cured on the backlight unit 70 to become the adhesive sheet 30. Accordingly, as the light irradiated through the light guide plate 40 passes through the adhesive sheet 30, the light is scattered by the grains 35 in the adhesive sheet 30 and thus is diffused.

That is, the adhesive sheet 30 can allow the backlight unit 70 to adhere to the liquid crystal panel 10 and simultaneously function as a diffusion sheet.

Thereafter, the reflective sheet 50 can be coupled to the rear surface of the light guide plate 40.

Referring to FIG. 5, the frame 100 is formed, which receives the liquid crystal panel 10, the adhesive sheet 30 and the backlight unit 70. In particular, the liquid crystal panel 10 and the backlight unit 70 have been coupled to each other by using the adhesive sheet 30.

The liquid crystal panel 10, the adhesive sheet 30 and the backlight unit 70 are located on a mold 200 of a molding machine. The mold 200 is used to manufacture the frame 100. For example, the mold 200 may comprise a horizontal surface, on which the backlight unit 70 and the liquid crystal panel 10 are mounted, and a vertical surface extending in the vertical direction from the horizontal surface. That is, the mold 200 may have a substantially L-shaped section.

As the backlight unit 70 and the liquid crystal panel 10 are mounted in the mold 200, the space for forming the frame 100 is formed between the mold 200 and the backlight unit 70/the liquid crystal panel 10.

Then, after a material injector 300 is shifted to the space formed between the mold 200 and the backlight unit 70/the liquid crystal panel 10, resin, which is material of the frame 100, is injected into the space. For example, the resin may include synthetic resin or silicon.

Accordingly, the space formed between the mold 200 and the backlight unit 70/the liquid crystal panel 10 is filled with the resin. At this time, the resin penetrates into the gap between the backlight unit 70 and the liquid crystal panel 10 while filling the space.

After the resin is completely injected, the resin is cured for a predetermined time period. Thus, as shown in FIG. 6, the frame 100 fixedly coupled to the backlight unit 70 and the liquid crystal panel 10 is formed.

The frame 100 formed by the injection of the resin is fixedly coupled to the liquid crystal panel 10 and the backlight unit 70.

In detail, after the liquid resin is injected into the liquid crystal panel 10 and the backlight unit 70 coupled to each other by using the adhesive sheet 30, the resin is cured to form the frame 100. Simultaneously, the frame 100 is integrally formed with the liquid crystal panel 10 and the backlight unit 70.

Accordingly, since the frame 100 is coupled to the liquid crystal panel 10 and the backlight unit 70 at a time, the manufacturing process of the display device can be simplified and the manufacturing cost thereof can be reduced.

Figure 7:
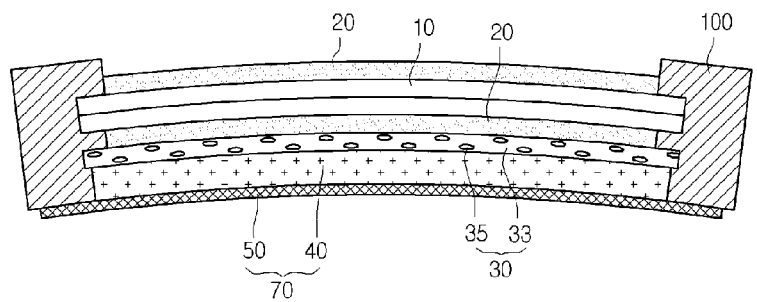
FIG. 7 is a sectional view showing a state in which the display device in FIG. 6 is bent.

FIG. 7 is a sectional view showing a state in which the frame receiving the liquid crystal panel, the adhesive sheet and the backlight unit and the liquid crystal panel is bent by a predetermined angle.

Referring to FIG. 7, in a state in which the liquid crystal panel 10 and the backlight unit 70 are received in and fixed to the frame 100, when the frame 100 is forcedly bent, the liquid crystal panel 10 and the backlight unit 70 can be integrally bent without being separated from each other.

That is, the liquid crystal panel 10 is bent when the liquid crystal panel 10 is thinned below a predetermined thickness, and the liquid crystal panel 10 is coupled to the backlight unit 70 in a face-to-face manner by means of the adhesive sheet 30 so that the coupling force between the liquid crystal panel 10 and the backlight unit 70 is reinforced. Accordingly, the liquid crystal panel 10 and the backlight unit 70 can be bent together.

Further, since the frame 100 also has elasticity, the frame 100 can be integrally bent in a state in which the frame 100 receives the liquid crystal panel 10 and the backlight unit 70.

Further, since the frame 100 can absorb external impact, the impact resistance of the display device can be improved.

Further, since the resin is injected onto the outer peripheral surfaces of the liquid crystal panel 10 and the backlight unit 70 to form the frame 100, the coupling strength between the liquid crystal panel 10 and the backlight unit 70 can be enhanced.

Further, since the liquid crystal panel 10 and the backlight unit 70 are coupled to each other by using the adhesive sheet 30, the manufacturing procedure can be simplified and the manufacturing cost can be reduced.

Furthermore, since the frame 100 formed through the injection of the resin is closely fixed and cured relative to the liquid crystal panel 10 and the backlight unit 70, the coupling strength between the liquid crystal panel 10 and the backlight unit 70 is increased. Accordingly, the liquid crystal panel 10 and the backlight unit 70 can be prevented from being broken due to external impact, differently from the prior art.

Moreover, even if the backlight unit 70 and the liquid crystal panel 10 have a thin thickness, the frame 100 can be manufactured matching with the thickness of the backlight unit 70 and the liquid crystal panel 10. Accordingly, the display device can be fabricated with a slim structure and a small size.

In addition, since the display device has flexible characteristics due to the flexible material and structure of the frame 100, the frame can be applied to various display apparatuses.

Figure 8:
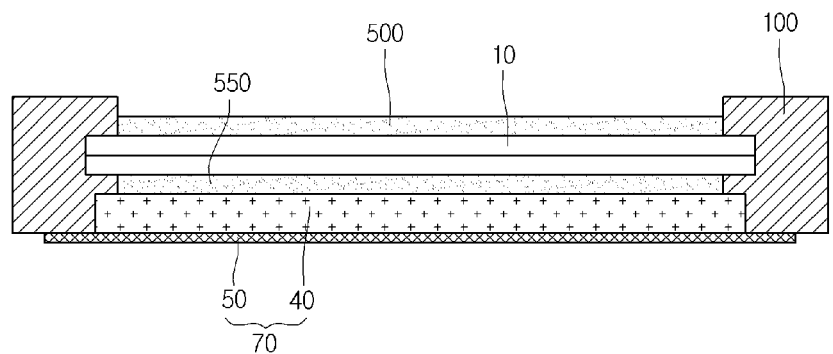
FIG. 8 is a sectional view showing a display device according to a second embodiment.
Figure 9:
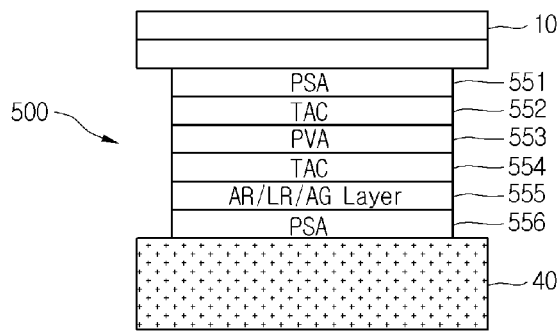
FIG. 9 is a sectional view showing the construction of a polarizer film of a display device according to a second embodiment.
Figure 10:
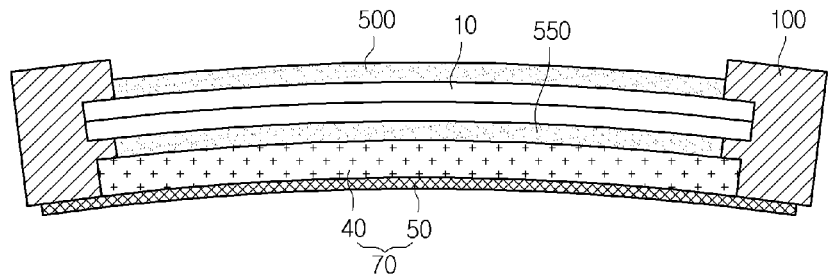
FIG. 10 is a sectional view showing a state in which the frame in FIG. 8 is bent.

FIG. 8 is a sectional view showing a display device according to a second embodiment, FIG. 9 is a sectional view showing the construction of a polarizer film coupled between the liquid crystal panel and the light guide plate shown in FIG. 8, and FIG. 10 is a sectional view showing a state in which the frame in FIG. 8 is bent.

Referring to in FIG. 8, the display device comprises the liquid crystal panel 10 and the backlight unit 70 as shown in FIG. 1.

The liquid crystal panel 10 is formed by interposing a liquid crystal layer between a TFT substrate and a color filter substrate. Further, first and second polarizer films 500 and 550 are formed on the upper and lower portions of the liquid crystal panel 10.

Since the backlight unit 70 has the same construction as that of the backlight unit of the first embodiment, detailed description thereof will be omitted. The backlight unit 70 comprises a light guide plate 40 and a reflective sheet 50. Further, an adhesive sheet for light diffusion may also be formed on the light guide plate 40.

The liquid crystal panel 10 and the backlight unit 70 are coupled to each other. To this end, according to the second embodiment, the liquid crystal panel 10 adheres to the backlight unit 70 by using the second polarizer film 550.

The first polarizer film 500 comprises a PSA (pressure sensitive adhesive) layer, a TAC (tri-acetyl cellulose) layer, a PVA (polyvinyl alcohol) layer, a TAC layer and an AR/LR/AG (anti-glare/low reflection/anti-reflection) layer. The PSA layer serves as an adhesive layer, the TAC layer protects the PVA layer, and the PVA layer controls the amount of light according to the polarization degree of the light.

Accordingly, the first and second polarizer films 500 and 550 are coupled to the upper and lower portions of the liquid crystal panel 10 to polarize incident light.

According to the second embodiment, the liquid crystal panel 10 can adhere to the backlight unit 70 by using the PSA layer.

According to the second embodiment, the second polarizer film 550 comprises a first PSA layer 551, a TAC layer 552, a PVA layer 553, a second TAC layer 554, an AR/LR/AG layer 555 and a second PSA layer 556.

That is, the first and second PSA layers 551 and 556 that serve as adhesive layers are formed on the upper and lower portions of the second polarizer film 550, so that the liquid crystal panel 10 can be coupled to the backlight unit 70.

The first polarizer film 500 is coupled to the upper portion of the liquid crystal panel 10 and the second polarizer film 550 is coupled to the lower portion of the liquid crystal panel 10. Further, the liquid crystal panel 10 is installed at the upper portion of the light guide plate 40 of the backlight unit 70.

Then, the second PSA layer 556 of the second polarizer film 550 located at the lower portion of the liquid crystal panel 10 is coupled to the entire surface of the light guide plate 40.

At this time, the liquid crystal panel 10, and the first and second polarizer films 500 and 550 can have an area wider than that of the light guide plate 40. Then, the second polarizer film 550 can simultaneously adhere to the light guide plate 40 and the upper surface of the sidewall of the frame 100 receiving the light guide plate 40.

Accordingly, the liquid crystal panel 10 can be coupled to the backlight unit 70 by using the second polarizer film 550.

FIG. 10 is a sectional view showing a state in which the frame receiving the liquid crystal panel and the backlight unit is bent.

Referring to FIG. 10, in a state in which the liquid crystal panel 10 and the backlight unit 70 are received in and fixed to the frame 100, when the frame 100 is forcedly bent, the liquid crystal panel 10 and the backlight unit 70 can be bent without being separated from each other.

That is, the liquid crystal panel 10 is bent when the liquid crystal panel 10 is thinned below a predetermined thickness, and the liquid crystal panel 10 is coupled to the backlight unit 70 in a face-to-face manner by means of the second polarizer film 550, which adheres to the lower portion of the liquid crystal panel 10, so that the coupling force between the liquid crystal panel 10 and the backlight unit 70 is reinforced. Accordingly, the liquid crystal panel 10 and the backlight unit 70 can be bent together. The frame 100 may comprise silicon or metal.

Further, the frame 100 can be integrally bent in a state in which the frame 100 receives the liquid crystal panel 10 and the backlight unit 70.

Further, since the frame 100 can absorb external impact, the impact resistance of the display device can be improved.

According to the second embodiment, the second polarizer film 550 can couple the liquid crystal panel 10 to the backlight unit 70 in a face-to-face manner, so that the coupling strength of the liquid crystal panel 10 and the backlight unit 70 can be enhanced.

Further, since the liquid crystal panel 10 and the backlight unit 70 are coupled to each other by using the second polarizer film 550, an additional adhesive member for coupling the liquid crystal panel 10 to the backlight unit 70 is not necessary. Accordingly, the manufacturing procedure can be simplified and the manufacturing cost can be reduced.

Furthermore, since the liquid crystal panel 10 and the backlight unit 70 are coupled to each other by using the second polarizer film 550, the display device can be manufactured with a slim structure and a small size.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

INDUSTRIAL APPLICABILITY

The display device according to the embodiments can be applied to a display module.

The invention claimed is:

1. A display device comprising:
    a frame receiving at least one of a liquid crystal panel and a backlight unit; and
    an adhesive layer coupling the liquid crystal panel to the backlight unit;
    wherein the adhesive layer comprises at least one of an adhesive sheet for light diffusion, which diffuses light, and a polarizer film,
    wherein the frame comprises sidewalls formed with a first receiving groove, a second receiving groove, a third receiving groove, and a wall,
    wherein the first receiving groove receives a side portion of the liquid crystal panel,
    wherein the second receiving groove receives a side portion of the backlight unit,
    wherein the third receiving groove receives a side portion of the adhesive layer,
    wherein the wall is formed between the first receiving groove and the third receiving groove, and
    wherein the adhesive layer is attached to a lower portion of the wall and the third receiving groove.

2. The display device as claimed in claim 1, wherein the frame comprises at least one of silicon and synthetic resin.

3. The display device as claimed in claim 1, wherein the adhesive sheet comprises liquid adhesive and grains for light scattering.

4. The display device as claimed in claim 3, wherein the liquid adhesive comprises resin and the grains comprise acryl.

5. The display device as claimed in claim 1, wherein the polarizer film comprises at least two of a first PSA (pressure sensitive adhesive) layer, a first TAC (tri-acetyl cellulose) layer, a PVA (polyvinyl alcohol) layer, a second TAC layer, an AR/LR/AG (anti-glare/low reflection/anti-reflection) layer, and a second PSA layer.

6. A display device comprising:
    a frame receiving at least one of a liquid crystal panel and a backlight unit; and
    an adhesive layer coupling the liquid crystal panel to the backlight unit;
    wherein the frame comprises resin,
    wherein the frame comprises sidewalls formed with a first receiving groove, a second receiving groove, a third receiving groove, and a wall,
    wherein the first receiving groove receives a side portion of the liquid crystal panel,
    wherein the second receiving groove receives a side portion of the backlight unit,
    wherein the third receiving groove receives a side portion of the adhesive layer,
    wherein the wall is formed between the first receiving groove and the third receiving groove, and
    wherein the adhesive layer is attached to a lower portion of the wall and the third receiving groove.

7. The display device as claimed in claim 6, wherein the adhesive sheet comprises liquid adhesive and grains for light scattering.

8. The display device as claimed in claim 6, wherein the adhesive layer comprises at least two of a first PSA layer, a first TAC layer, a PVA layer, a second TAC layer, an AR/LR/AG layer, and a second PSA layer.

9. A method for manufacturing a display device, the method comprising the steps of:
    installing at least one of a liquid crystal panel and a backlight unit in a mold for forming a frame;
    injecting resin into the mold; and curing the resin to form the frame coupled to at least one of the liquid crystal panel and the backlight unit,
wherein the liquid crystal panel and the backlight unit are coupled to each other and then installed in the mold,
coating adhesive sheet material for light diffusion on the backlight unit; and
coupling the liquid crystal panel to the backlight unit coated with the adhesive sheet material,
wherein the frame comprises sidewalls formed with a first receiving groove, a second receiving groove, a third receiving groove, and a wall,
wherein the first receiving groove receives a side portion of the liquid crystal panel,
wherein the second receiving groove receives a side portion of the backlight unit,
wherein the third receiving groove receives a side portion of the adhesive sheet material,
wherein the wall is formed between the first receiving groove and the third receiving groove, and
wherein the adhesive sheet material is attached to a lower portion of the wall and the third receiving groove.

10. The method as claimed in claim 9, wherein the adhesive sheet material comprises a mixture of liquid adhesive and grains for light scattering.

11. The method as claimed in claim 10, wherein the liquid adhesive comprises resin and the grains comprise acryl.

12. The method as claimed in claim 9, wherein the mold is formed matching with an appearance of the liquid crystal panel and the backlight unit.

13. The method as claimed in claim 9, wherein the resin comprises at least one of synthetic resin and silicon.

14. The method as claimed in claim 9, wherein the frame is formed in a space between the mold and the liquid crystal panel/the backlight unit.

15. The method as claimed in claim 9, wherein the resin is injected between the liquid crystal panel and the backlight unit.

16. The method as claimed in claim 9, further comprising a step of forming polarizer films on upper and lower portions of the liquid crystal panel to couple the liquid crystal panel to the backlight before installing the liquid crystal panel and the backlight in the mold.

17. The method as claimed in claim 16, wherein the polarizer film comprises at least two of a first PSA layer, a first TAC layer, a PVA layer, a second TAC layer, an AR/LR/AG layer, and a second PSA layer.

* * * * *